US007604448B2

(12) United States Patent
Balk et al.

(10) Patent No.: US 7,604,448 B2
(45) Date of Patent: Oct. 20, 2009

(54) APPARATUS AND TRANSPORT CONTAINER FOR TRANSPORT AND CONTROLLED DISCHARGE OF A LOAD

(75) Inventors: Wouter Balk, Baarn (NL); Jozef Walter Maria Hopman, Weesp (NL)

(73) Assignee: EuroSort B.V., Weesp (NL)

( * ) Notice: Subject to any disclaimer, the term of this patent is extended or adjusted under 35 U.S.C. 154(b) by 310 days.

(21) Appl. No.: 10/495,783

(22) PCT Filed: Nov. 15, 2002

(86) PCT No.: PCT/NL02/00744

§ 371 (c)(1),
(2), (4) Date: Sep. 8, 2004

(87) PCT Pub. No.: WO03/042079

PCT Pub. Date: May 22, 2003

(65) Prior Publication Data

US 2005/0006206 A1   Jan. 13, 2005

(51) Int. Cl.
*B65G 35/06* (2006.01)
*B65G 47/38* (2006.01)

(52) U.S. Cl. .............................. 414/331.03; 198/465.2; 198/795

(58) Field of Classification Search ............ 414/331.01, 414/331.02, 331.03; 198/465.2, 795
See application file for complete search history.

(56) References Cited

U.S. PATENT DOCUMENTS

| 2,469,575 | A | * | 5/1949 | Ralston et. al. ............. 246/465 |
| 2,595,689 | A | | 5/1952 | Mitchell |
| 3,086,636 | A | | 4/1963 | Raynor |
| 3,296,954 | A | * | 1/1967 | Haub et. al. .................... 99/404 |
| 3,300,027 | A | * | 1/1967 | Booij ......................... 198/704 |
| 3,817,369 | A | | 6/1974 | Bluthardt et al. |
| 3,848,726 | A | * | 11/1974 | Wiemer ....................... 198/795 |
| 3,858,519 | A | * | 1/1975 | Masino et al. .............. 198/524 |
| 4,051,969 | A | * | 10/1977 | Homanick ................... 414/679 |
| 4,266,903 | A | * | 5/1981 | Surbrook ..................... 414/680 |
| 4,574,962 | A | * | 3/1986 | Tabler et al. ................. 211/122 |
| 4,892,185 | A | * | 1/1990 | Guardiola ................ 198/477.1 |
| 5,090,555 | A | * | 2/1992 | Kura ....................... 198/465.1 |
| 5,090,863 | A | * | 2/1992 | Lichti et al. ............ 414/331.03 |
| 5,171,120 | A | * | 12/1992 | Bernard et al. ......... 414/331.03 |

(Continued)

FOREIGN PATENT DOCUMENTS

EP    0 595 434    5/1994

(Continued)

*Primary Examiner*—James Keenan
(74) *Attorney, Agent, or Firm*—Young & Thompson

(57) ABSTRACT

An apparatus for transport and controlled discharge of a load has a frame with a guide for a series of displaceable transport containers, a drive unit for carrying the containers in an endless track, a resetting device for placing a container in a starting position and discharge station for selectively relieving a container of a load. The containers have an at least partially movable carrying panel for receiving the load thereon, including a tray which can be operated selectively between a transporting and discharge positions. The guide provides on either side of the containers a support surface on which the containers support with free-running wheels. On at least one side of the containers the support surface displays a convexity in a direction transversely of the transport direction with an apex on which a running surface of at least one wheel is received.

15 Claims, 6 Drawing Sheets

U.S. PATENT DOCUMENTS

| | | |
|---|---|---|
| 5,346,052 A | 9/1994 | Fox |
| 5,556,247 A * | 9/1996 | Lichti et al. ............ 414/331.03 |
| 5,601,395 A * | 2/1997 | Lichti et al. ................. 414/807 |
| 5,842,556 A * | 12/1998 | van Hattum ........... 198/370.05 |
| 6,425,478 B1 * | 7/2002 | Eberle ........................ 198/795 |
| 6,464,066 B2 * | 10/2002 | Bethke et al. ............. 198/465.1 |
| 6,502,691 B2 * | 1/2003 | Akatsuka et al. ............ 198/795 |
| 6,662,930 B2 * | 12/2003 | Yester ..................... 198/502.1 |
| 7,128,202 B2 * | 10/2006 | Balk et al. .................. 198/704 |
| 2003/0034237 A1 * | 2/2003 | Yester ........................ 198/959 |

FOREIGN PATENT DOCUMENTS

| | | |
|---|---|---|
| GB | 693365 | 7/1953 |
| GB | 961013 | 6/1964 |
| NL | 9001116 | 12/1991 |
| NL | 9100108 | 8/1992 |
| NL | 9400388 | 10/1995 |

* cited by examiner

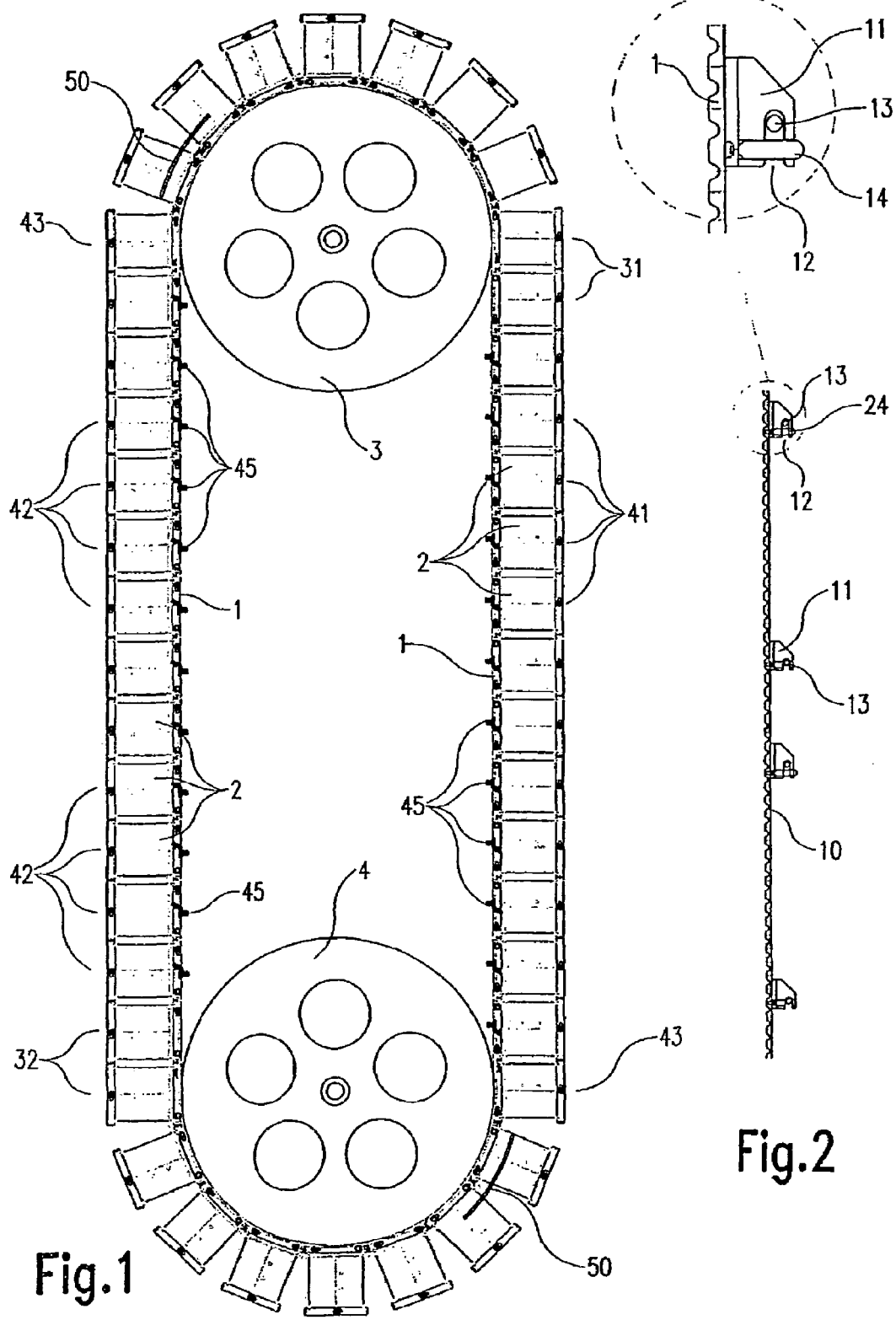

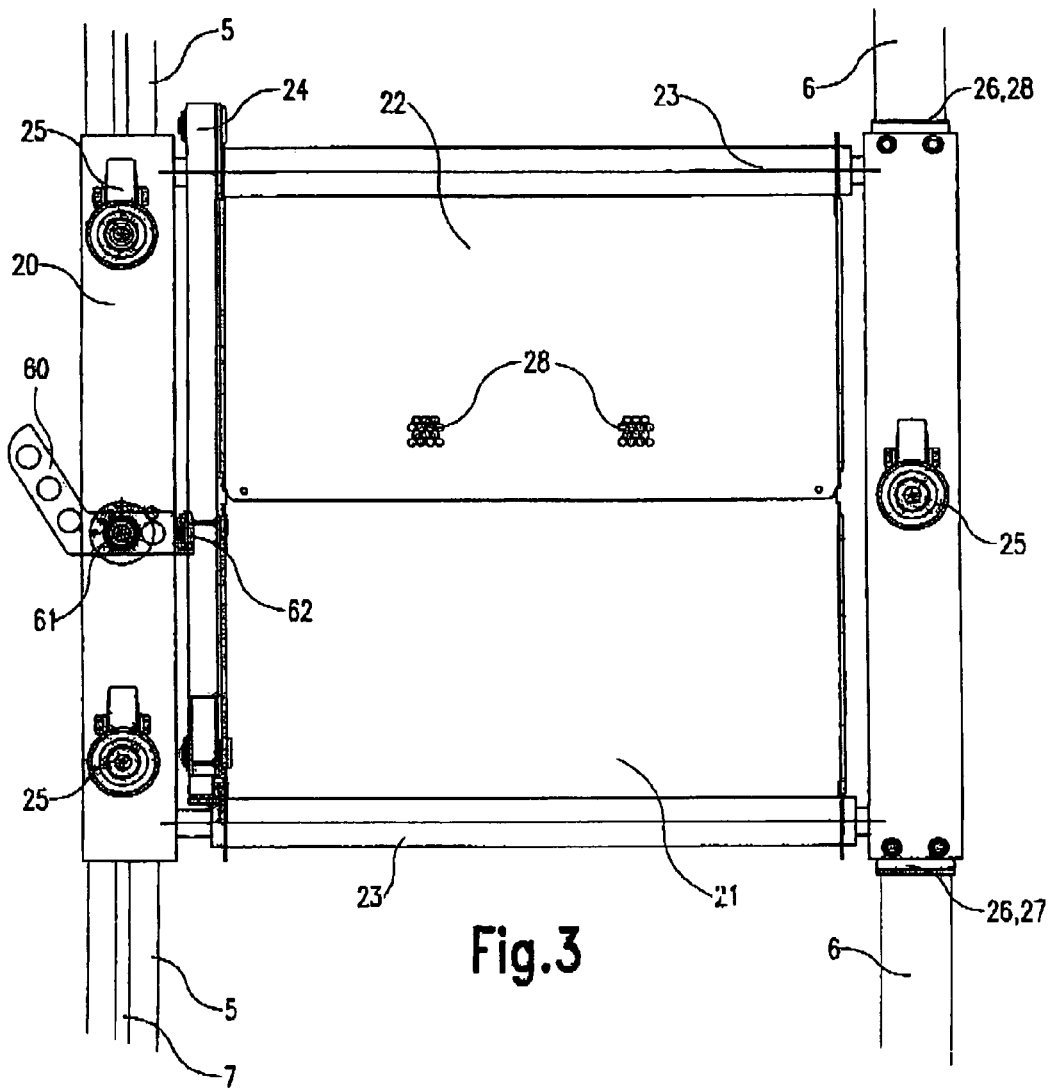
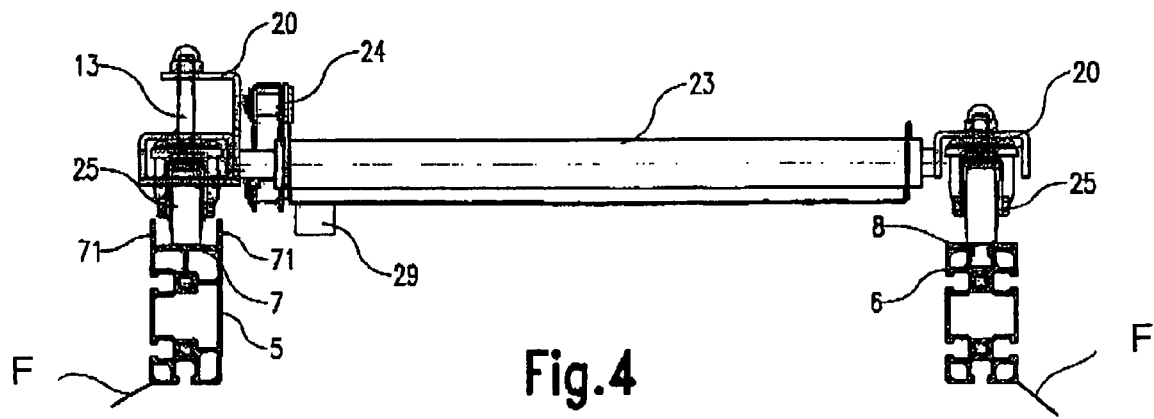

APPARATUS AND TRANSPORT CONTAINER FOR TRANSPORT AND CONTROLLED DISCHARGE OF A LOAD

BACKGROUND OF THE INVENTION

The present invention relates to an apparatus for transport and controlled discharge of a load, comprising a frame with a guide for a series of displaceable transport containers, drive means for carrying the transport containers in an endless track, a resetting device for placing a transport container in a starting position and a discharge station for selectively receiving a load of a transport container, wherein the transport containers are provided with an at least partially movable carrying panel for receiving of the load thereon, comprising a tray which can be operated selectively between a transporting position and a discharge position.

Such an apparatus is applied in particular as sorting device for goods in distribution centres, mail order companies and production environments where different products have to be brought together per (dispatch) destination. The goods for sorting can per se be of many types but particularly comprise books, magazines, items of clothing and other articles with a significant own weight. The apparatus herein normally comprises a connected series of a few dozen to a few hundred transport containers in accordance with the desired sorting capacity. Per discharge station a dispatch box or other receiving means can be placed in which the goods are received per destination. The goods are supplied from a loading station to the transport containers in a sequence which is in principle random and identified manually or otherwise. The drive means carries the transport containers around the track at a relatively high speed, wherein at a certain moment a transport container will pass the discharge station for which the carried product is intended. Having arrived there, an electronic control of the apparatus sets means of the discharge station into operation which are able to actuate the locking mechanism of the transport container and thus release the tilt trays. Under the influence of the force of gravity the tilt trays drop open almost immediately and thus discharge the product into the waiting dispatch box or the like. The transport container then passes over the resetting device, wherein the two tilt trays are closed and the transport container is returned to its starting position, ready for a subsequent lap. Products can thus be distributed over the different discharge stations with a relatively large sorting capacity.

A known apparatus of the type indicated in the preamble is described in a Netherlands patent application made open to public inspection under number 9100108. The known apparatus comprises a drive means in the form of an endless chain to which is coupled a series of transport containers which are each guided on a first longitudinal side over a substantially vertical guide with two systems of four guide wheels and hang freely on an opposite longitudinal side. Owing to the relatively high own weight of the transport containers, which in practice may be in the order of magnitude of 20 kilograms, the guide is herein subjected to a relatively heavy load whereby the guide wheels and the guide itself have to take a correspondingly heavy form to withstand these loads. This not only makes the apparatus extra-costly but also more susceptible to wear. The transport chain will moreover stretch continuously during operation, whereby it will have to be regularly re-tensioned and the apparatus will thereby have to be taken out of operation.

A more uniform distribution of forces is achieved in another known apparatus of the type stated in the preamble known from a Netherlands patent application made open to public inspection under number 9400388. The apparatus herein comprises a guide in the form of two parallel u-profiles with their open sides directed toward each other. In this guide there runs a series of mutually coupled transport containers which are carried along by an endless transport chain. The weight of the transport containers is thus supported in large part by the guide and rests only partly on the transport chain. Providing a transverse tracking are the two u-profiles in which the transport containers run with transport wheels which are fully enclosed therein. The transport containers are thus pushed tightly into the track and pulled forward therein by the transport chain which is herein continuously subject to stretch. The individual positions of the transport containers hereby change gradually and may eventually result in synchronization problems of the system. In order to also be able to follow bends in the track the transport container must here have a certain freedom of transverse movement, which will however make an exact tracking more difficult. Furthermore, this apparatus is impractical in respect of maintenance and replacement of one or more of the transport containers, since these cannot be removed without problem because they are completely enclosed in the guide. The apparatus is therefore inoperative for a relatively long period during such maintenance.

The present invention has for its object, among others, to provide an apparatus of the type stated in the preamble with which these drawbacks are not associated, or at least to a considerably lesser extent.

SUMMARY OF THE INVENTION

An apparatus of the type stated in the preamble has for this purpose the feature according to the invention that the guide provides on either side of the transport containers a support surface on which the transport containers support with free-running wheels, and that on at least one of the sides of the transport containers the support surface comprises a convexity in a direction transversely of a transport direction of the transport containers for receiving thereon a running surface of at least one of the wheels of the transport containers. This apparatus essentially comprises a series of separate carriages pulled forward by the drive means. If desired, these carriages can in principle be removed everywhere in the apparatus in relatively simple manner without having to actuate the other transport containers and parts of the apparatus, which will particularly facilitate maintenance of the apparatus and especially of individual transport containers. The convexity of at least one of the support surfaces over which these carriages run provides the desired tracking, without per se enclosing the transport containers in any way. The apex of such a convexity in the support surface is found in practice to urge the transport containers automatically into the desired track, while a freedom of transverse movement of the transport containers is retained. All in all the invention hereby offers a relatively simple and operationally reliable solution for an apparatus of the type stated in the preamble.

In a preferred embodiment the apparatus according to the invention is herein characterized in that the wheels with which the transport containers support comprise at least one castor. Because of the intrinsic maneuverability of castors the transport containers are thus able to follow possible bends in the track easily and in tracking manner.

In a particular embodiment the apparatus according to the invention is characterized in that the drive means comprise an endless driven belt which runs along the track and to which the transport containers are coupled. Such a belt drive requires relatively little maintenance and in particular no readjustment or re-tensioning. The belt rotates round a number of revolving wheels along the track, wherein the coupled series of transport containers supporting on the guide holds the belt at the correct height and on the revolving wheels. An additional locking to avoid the belt running off the wheels is then found to be unnecessary in practice. Because the transport containers are wholly or largely supported by the guide, the load on the belt is moreover small, wherein furthermore the belt is mainly, if not exclusively, under strain of tension when co-displacing the transport containers, which is a natural load. A belt drive is also relatively quiet.

In a further particular embodiment the apparatus according to the invention has the feature that the carrying panel comprises at least one tilt tray which is selectively tiltable on a tilt axis between a substantially horizontal transporting position and a downward hanging discharge position. By simply releasing the tilt tray in the transporting position, it will tilt downward under its own weight and that of a load resting thereon and assume the discharge position. The load herein drops out of the transport container and can be collected in a waiting box or in other manner under the path of the transport containers.

In order to prevent the transport containers running out of the guide through the effect of an unintended transverse force, a particular embodiment of the apparatus according to the invention has the feature that at least one of the support surfaces forms part of a substantially u-shaped profile in which at least one of the wheels of a transport container is received. The upright side walls of the u-profile herein provide a stop surface which holds the wheels in the guide. So as to protect the wheels here, a further embodiment of the apparatus according to the invention has the feature that the transport container comprises on either side of the wheel a stop which is adapted to strike against an upright wall of the profile in the case of a transverse displacement of the transport container. In an extreme case it is therefore the stop and not the wheel itself which strikes against the profile wall, thereby avoiding damage to the wheel.

A significant part of the reliability and operation of the apparatus according to the invention results from the mutual co-action between the drive belt and the series of transport containers coupled thereto. On the one hand the transport containers are advanced by the drive belt and coupled thereto at the desired pitch, on the other hand the series of transport containers carries and holds the drive belt at the correct height and in the correct track. The greater the engagement between the separate transport containers, the better the transport containers are able to control the running of the drive belt. The invention has the further object of providing an apparatus of the type stated in the preamble with an increased engagement between the successive transport containers.

For this purpose an apparatus of the type stated in the preamble has the feature according to the invention that between successive transport containers there are provided coupling members which, at least in a part of the track, are capable of mutual co-action in order to realize an engagement between the relevant transport containers. The coupling members herein provide extra engagement between the transport containers, so that the drive belt is held in place not only by the transport containers individually but also by the transport containers together. The coupling members simultaneously form a stop between successive transport containers so as to thereby absorb the rotation energy associated with a bend movement when an acceleration to a linear movement occurs. The coupling members are thus found capable in practice of very effectively suppressing rocking of the transport containers as they come out of a bend.

A particular embodiment of the apparatus according to the invention has the feature that the coupling members comprise on the one transport container a substantially horizontally rib directed transversely of a transporting direction of the transport containers and an at least substantially complementary groove on the other transport container, which rib can be received loosely in the groove. Such a rib received loosely in the groove fixes the transport containers in their transverse direction while retaining the desired freedom of transverse movement of the transport containers. In a more particular embodiment the apparatus according to the invention has the feature herein that the rib and groove are curved along at least a part of their length, whereby a fixation is also realized in transverse direction.

In order to improve mutual engagement of the rib and groove, a further preferred embodiment of the apparatus according to the invention has the feature that at least in cross-section the rib narrows toward a free end over at least a part of its height. As it approaches the groove the rib will hereby enter the groove with a narrowed portion and then be automatically centered therein. This self-positioning character reduces the chance of malfunctions.

In a further particular embodiment the apparatus according to the invention has the feature herein that the transport containers are provided on either side with coupling members in order to realize therewith an engagement with adjoining transport containers in at least a part of the track. The coupling members are preferably manufactured from plastic and arranged as separate elements on the transport containers. The coupling members thus form as it were bumpers between successive transport containers which reduce the noise production resulting from mutual contact.

For the purpose of easy maintenance and possible replacement of the drive belt, a further particular embodiment the apparatus according to the invention has the feature that the transport containers are coupled in manually releasable manner to the drive means. Use is preferably made here of a manually operated rapid-action coupling. In this case the transport containers can be detached easily and without additional tools from the drive means for the purpose of maintenance thereon when desired. It is thus also possible within a relatively short time to replace the transport containers with other transport containers which are for instance specifically geared to transport and discharge of particular goods.

Because of the invention the noise production of the apparatus is exceptionally low and the transporting speed can be increased within acceptable noise limits so as to thus increase the capacity of the apparatus. This will however also result, among other things, in an increase in the centrifugal forces occurring in the bends of the track. With a view hereto, a further particular embodiment of the apparatus according to the invention has the feature that the resetting device is arranged before the entry into a bend in the track. The transport containers are thus closed before passing through the bend, thus avoiding the transport containers being carried through the bend with loose-swinging tilt trays.

It is also necessary to avoid the load transported by the transport container being flung out of the transport container in a bend of the track. With a view hereto, a further particular embodiment of the apparatus according to the invention has the feature that a loading station is arranged after the exit from a bend in the track in order to feed a load to a passing transport container, and that the discharge station is placed before the entry into a subsequent bend in the track.

The processing capacity of the apparatus can be boosted by multiple utilization of the transport containers. For this purpose a particular embodiment of the apparatus according to the invention has the feature that the carrying panel of the transport containers comprises two sets of tilt trays which are placed adjacently of each other in a longitudinal direction and which pivot pairwise about a common tilt axis, that a resetting device, an operating member of a discharge station and a locking mechanism are provided for each set of tilt trays. The frame of the apparatus, which according to the invention extends on either side of the track, provides plenty of fixing options for including a resetting device and operating member of a discharge station for both sets of tilt trays. Each set of tilt trays in the transport container can thus separately carry a load and discharge it selectively in the correct discharge station, thereby doubling the processing capacity.

BRIEF DESCRIPTION OF THE DRAWINGS

The invention also relates to a transport container for use in the above described apparatus and will be further elucidated hereinbelow with reference to an embodiment and an associated drawing. In the drawing:

FIG. 1 shows a top view of an embodiment of an apparatus according to the invention;

FIG. 2 shows a partly detailed longitudinal section of a transport means as applied in the apparatus of FIG. 1;

FIG. 3 is a top view of a transport container as applied in the apparatus of FIG. 1;

FIG. 4 shows a cross-section of the transport container of FIG. 3 resting on a guide of the apparatus of FIG. 1;

DESCRIPTION OF THE PREFERRED EMBODIMENTS

Figure 5:
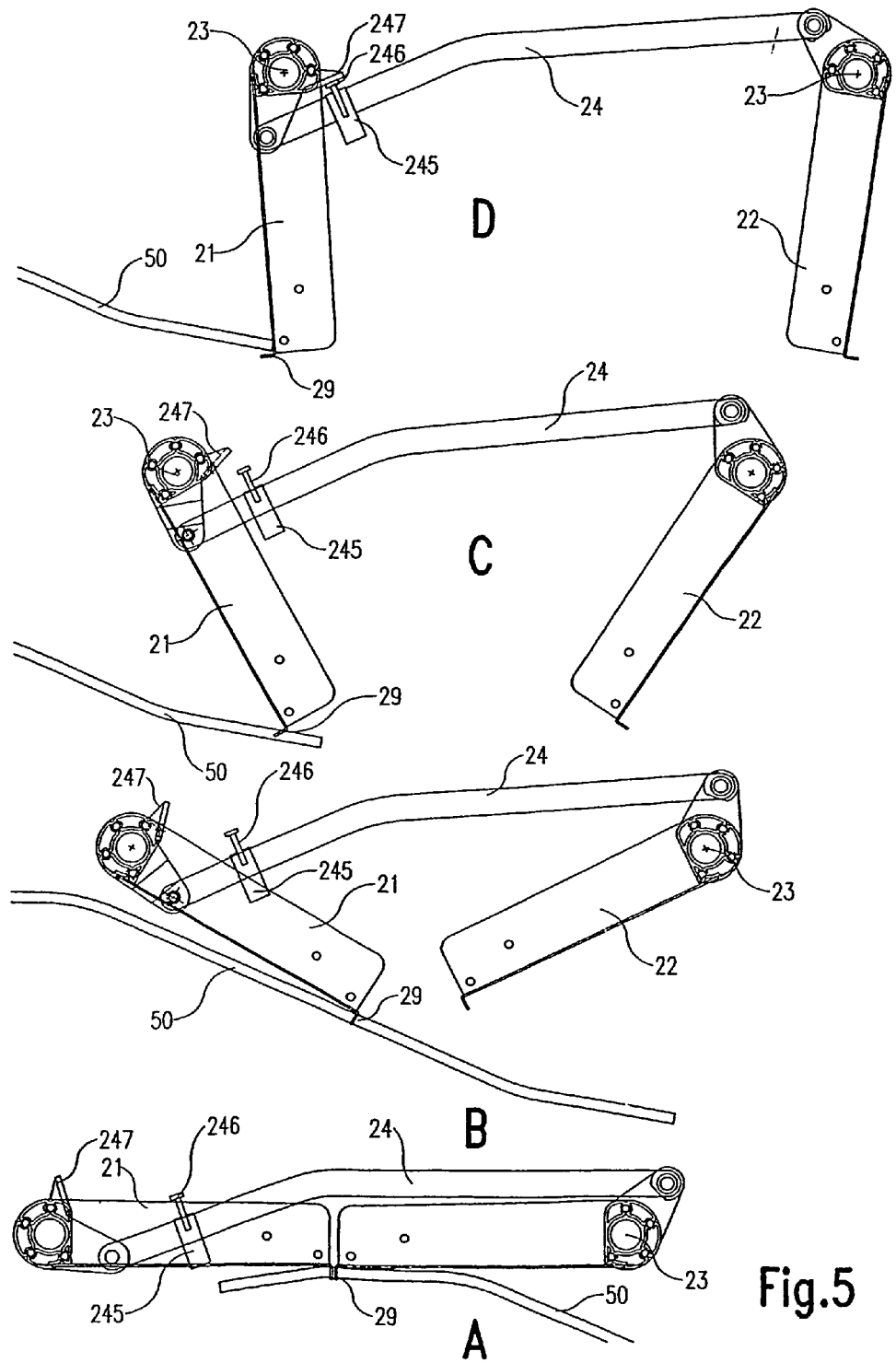
FIG. 5 shows schematically the transport container of FIGS. 3 and 4 at different stages of the closing thereof.

The figures are purely schematic and not drawn to scale. Some dimensions in particular are shown highly exaggerated for the sake of clarity. Corresponding parts are designated as far as possible in the figures with the same reference numeral.

FIG. 1 shows in partial top view an embodiment of an apparatus for transport and controlled discharge of products according to the invention. This is a sorting device, usually designated a bomb-bay sorter, for sorting books and magazines per destination and herein distributing them over dispatch boxes for the various destinations. The apparatus can however also be employed instead for sorting and distributing textile goods and other distribution goods. The apparatus is constructed around a fixedly disposed frame F (FIG. 4) and comprises a drive means in the form of an endless belt 1 to which is coupled a series of separate transport containers 2. Transport containers 2 comprise separate carriages and are each able to receive a load and discharge it selectively at the intended location. Belt 1 runs through a closed track over two revolving wheels 3, 4 arranged on the outer sides of the frame. One of the revolving wheels 3 is herein driven by a suitable electric motor or in other manner at a speed which can rise to about 5-20 revolutions per minute, while the other wheel 4 is free-running. The transport containers are thus co-displaced at a speed of about 0.5-2.5 meters per second in a track imposed by belt 1. The number of transport containers in large measure determines the sorting capacity of the apparatus and can increase in practice to about 300 units or even more, wherein the length of the apparatus exceeds 90 meters. Belt 1 is manufactured from a tough plastic such as polyethylene and reinforced with steel wires so as to be able to exert sufficient tensile force on the entirety of transport containers 2 during operation. Instead of a belt it is otherwise also possible to opt if desired for another type of endless drive means, such as for instance a chain or a (steel) cable, although, other than a chain, a belt requires no maintenance, or hardly any. A belt drive thus has no stretch which makes continuous re-tensioning necessary, nor does the belt require lubrication, so that the drive means remains relatively clean and contamination of the transported goods in particular is avoided. A belt drive is moreover quieter and provides the whole with more stability. The transport containers can thereby be given a wider and larger form while retaining stability and reliability, and are herein able to transport a heavier load.

Transport containers 2 are coupled to belt 1 by means of an easily and manually releasable rapid-action coupling. For this purpose the belt 1, see FIG. 2, is provided at regular intervals with rapid-action coupling members 11, which each comprise a cup 12 for receiving therein a shank of a bolt 13 or other coupling member of transport container 2. Transport containers 2 therefore each hook with a set of bolts 13 into a set of rapid-action coupling members 11, so that during operation they are pulled forward on bolts 13 by the rapid-action coupling members 11. A locking pin or other securing means 14 which confines bolt 13 in cup 12 herein avoids the possibility of the transport containers 2 becoming detached when the apparatus stops, whether or not abruptly. Owing to such a rapid-action coupling in combination with the free support of transport containers 2, these latter can be quickly and easily removed from or re-placed in the apparatus at any desired moment The period of time for which the apparatus is non-operational during maintenance or change-over operations can thus be significantly limited.

Figure 8:
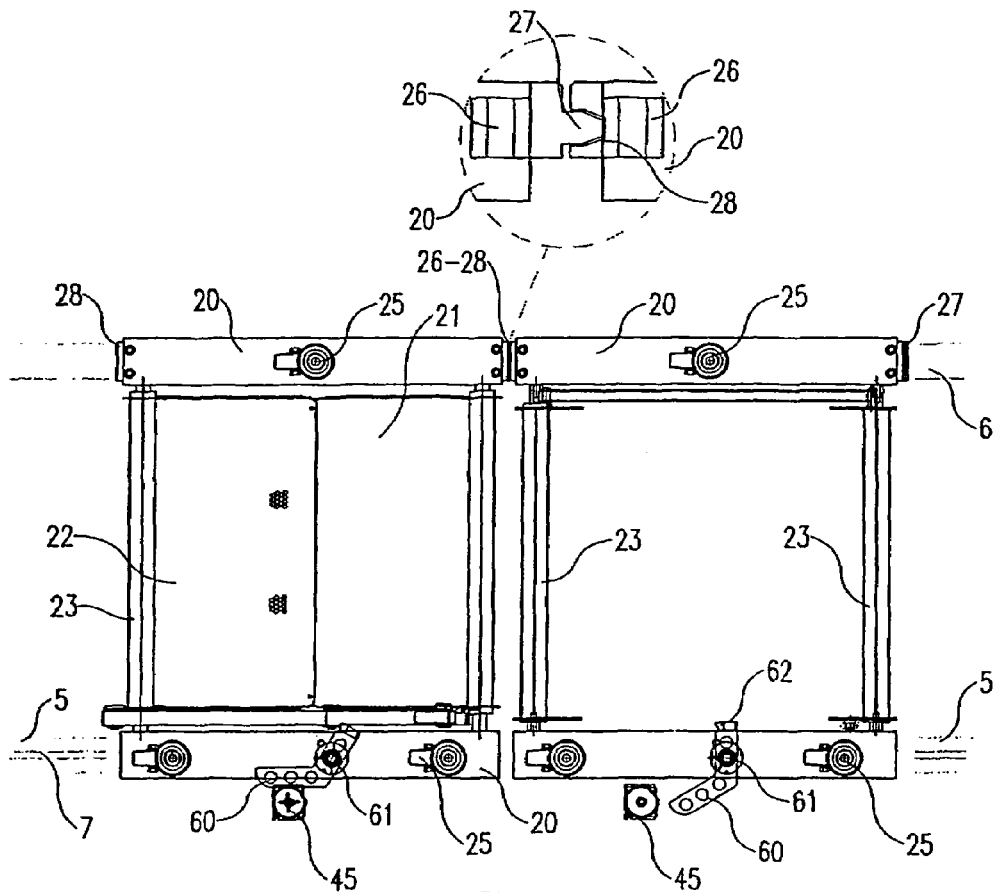
FIG. 8 shows a top view of two transport containers of FIG. 3 in mutually coupled situation.

The transport containers each comprise, see FIGS. 3 and 4, two relatively heavy longitudinal profiles 20 having therebetween a controllable carrying panel 21,22 for receiving thereon of a load for transporting. This carrying panel is formed here by two tilt trays 21,22 extending between tilt axes 23 located on either side thereof. In this embodiment the tilt trays 21,22 are connected fixedly to the tilt axes, wherein the tilt axes are in turn bearing-mounted in the longitudinal profiles. Tilt trays 21,22 are thus selectively tiltable on the respective tilt axes 23 between a substantially horizontal transporting position as shown in FIGS. 3 and 4, and a downward hanging discharge position as shown in FIGS. 8 and 9.

A locking mechanism fixes both trays 21,22 in the transporting position. This locking mechanism here comprises a lock 60 arranged resiliently via a torsion spring 63 on a rotation axis 61. In the balanced state shown in FIG. 3, lock 60 engages with a protrusion 62 under one of the tilt trays 21 to prevent tilting thereof. By moving lock 60 clockwise out of the balanced state counter to the spring tension the protrusion 62 is removed from under tilt trays 21,22 and these are released, so that under the influence of their own weight and that of a load possibly resting thereon they swing open in downward direction. If desired, a bias or other power assistance can herein be applied to enhance opening of the tilt trays 21,22.

Tilt trays 21,22 are mutually coupled in order to synchronize their tilting movements. In this embodiment this coupling comprises a coupling rod 24 which is mounted on both tilt trays for pivoting eccentrically relative to their respective tilt axes, see FIGS. 3, 5 and 6. Instead of a free, independent drop of the two tilt trays 21,22, the movement of the one tilt tray is now imposed wholly by the other, and vice versa. Owing to this coupling it suffices to fix only one of the two tilt trays 21,22 in transporting position. The mutual coupling ensures that the other tray also remains closed. An overlap of the edges of the two tilt trays, as shown and as necessary in many existing apparatuses, can strictly speaking then be dispensed with, which results in a lower noise production when the transport container is closed.

Figure 6:
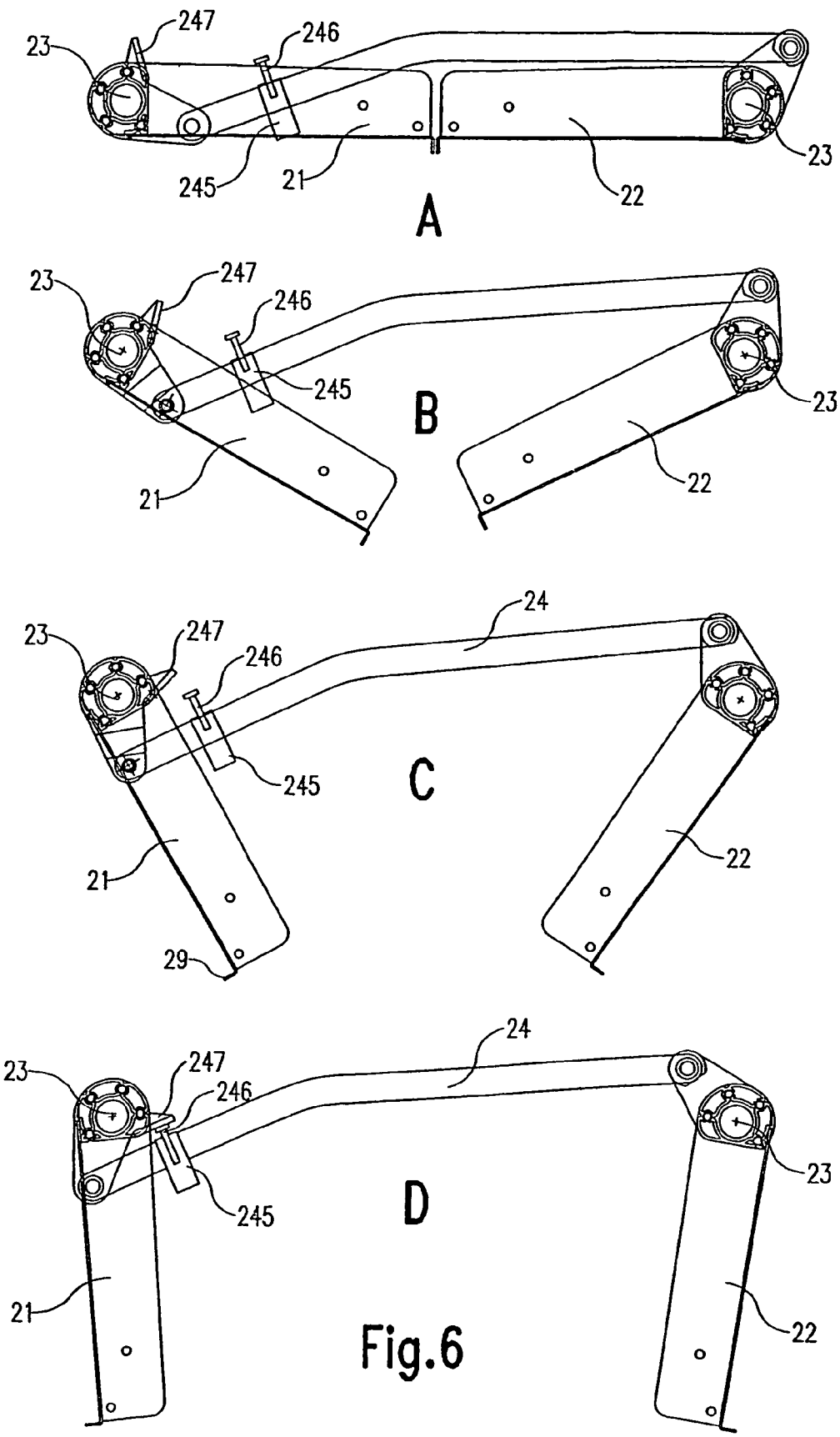
FIG. 6 shows schematically the operation of the transport container of FIGS. 3 and 4 at different stages of the discharge of a possible load.

It is also sufficient to close only one of the two tilt trays in order to return the whole transport container to the closed transporting position. The other tray will after all follow the closing movement of this tray. As shown in FIG. 5, advantageous use is made hereof in the present invention. During its movement through a resetting device the opened transport container 2 is guided against a closing guide 50 by a stop protrusion 29 provided thereon for this purpose, stage D. The closing guide comprises a profile which, as-seen in the direction of transport, gradually approaches the path and thereby the tilt axes 23 of transport container 2. The foremost tilt tray 21 is thus raised increasingly further, stages C and B, wherein the rear tilt tray 22 follows, urged to do so by coupling rod 24. A separate operating member protruding inconveniently at the top of transport container 2 can thus be omitted. One of the two tilt trays eventually presses the lock 60, not further shown in FIG. 5, out of its balanced state and then causes it to snap thereunder. Transport container 2 is now situated again in the closed starting position A and is again able to receive a load.

In addition to this and more advantages of more or less structural nature, the mutual coupling of tilt trays 21,22 provides a damping when they swing open, whereby continued swinging thereof is counteracted. This swinging must be avoided as far as possible since it could otherwise adversely interfere with an undisturbed drop of the load out of the transport container, and moreover result in a shorter lifespan of the tilt trays and tilt shafts. In the present embodiment the coupling takes a symmetrical form, whereby both tilt trays 21,22 make the same, albeit opposing, stroke from the transporting position A, see FIG. 6, via a number of intermediate stages B,C to the final downward hanging discharge position D. Instead of such a symmetrical coupling, it is also possible to opt for an asymmetrical coupling which results in a different distribution of the total stroke over the two trays. Using a coupling rod 24 this can for instance be realized by mounting this rod more or less eccentrically at the one tilt tray than at the other. Particularly such an asymmetrical coupling, wherein the two tilt trays make an unequal stroke and their tilting thereby goes out of phase, is able to avoid continued swinging of the trays to a great height. Various aspects are advantageously realized here such that the rear tilt tray 22 makes a tilt angle of more than 90°, while the foremost tray 21 executes a correspondingly smaller tilt angle. The rear tilt tray thus pivots beyond a vertical position, while the foremost remains slightly inclined to the rear. Thus avoided is the possibility of the discharged load striking against the rear tilt tray during its fall, while the foremost tilt tray of the advancing transport container is moving away from the load during this fall and will do no worse than guide the load in the desired direction.

In order to contain the sound level of the apparatus and have the tilt trays make a good, controlled stroke, the product holders are provided with damping means which control at least a part of the stroke of tilt trays 21,22. Continued swinging of the tilt trays after they have fallen open and the load resulting from an impact otherwise occurring here is thus effectively prevented. In this embodiment, see FIG. 6 in particular, the damping means comprise a damping body in the form of a high-grade shock absorber 245 which can strike with a damped damping rod 246 against a stop 247 provided for this purpose on the foremost tilt tray 21. The shock absorber is herein mounted in coupling rod 24 such that damping rod 246 comes into contact with stop 247 in the final part of the path of tilt trays 21,22. Tilt trays 21,22 hereby come to rest in controlled manner, while opening thereof is not otherwise slowed or impeded. Because the damping of the one tilt tray 21 is imposed on the other tilt tray 22 via the mutual coupling 24 of trays 21,22, only one such shock absorber 245 or other damping body is sufficient for damping both trays 21,22. This results in a significant cost-saving.

Figure 7:
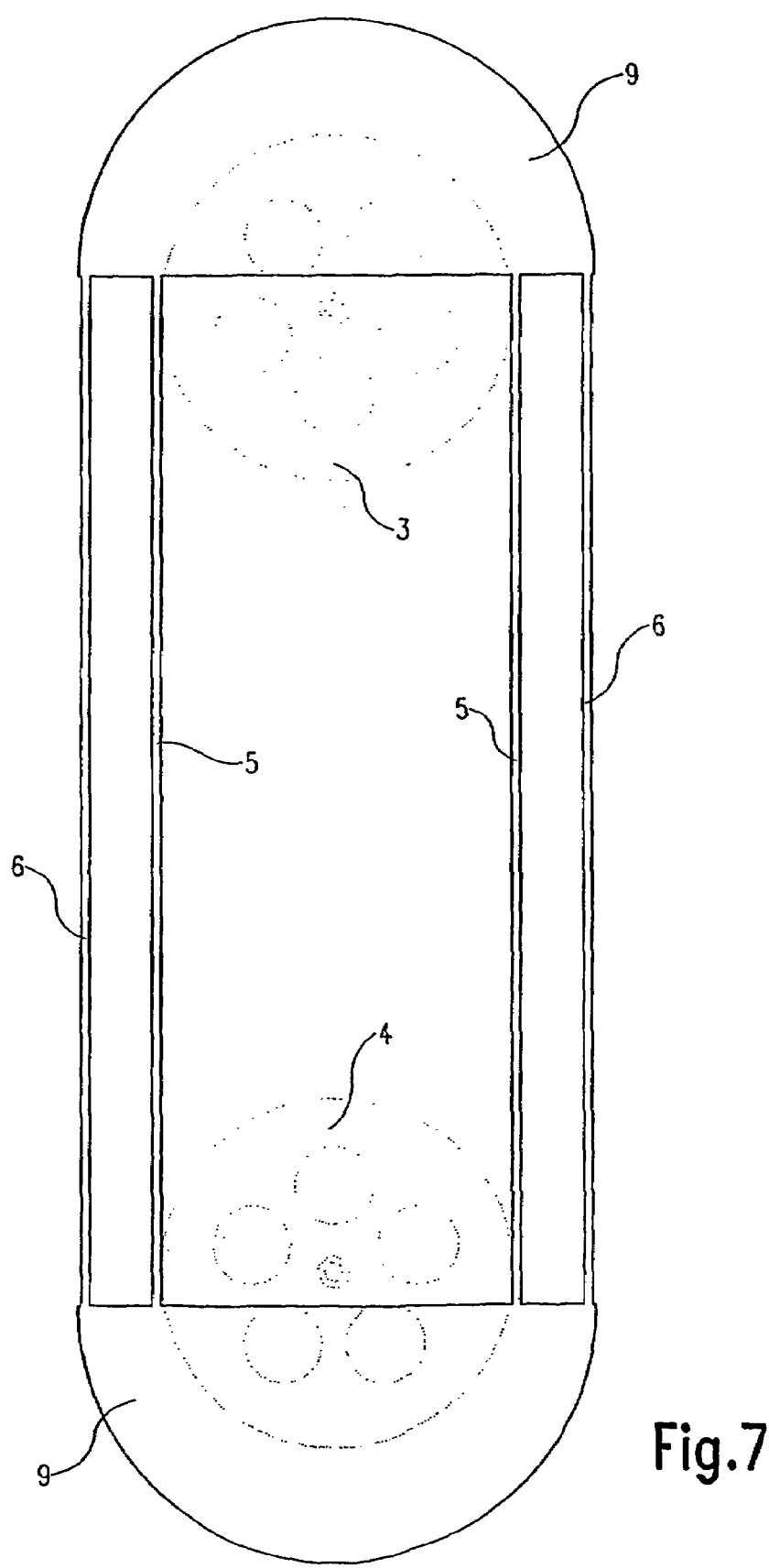
FIG. 7 shows schematically the guiding of the transport containers in the apparatus of FIG. 1.

Freely rotating castors 25 are arranged in both longitudinal profiles 20 of product containers 2. Particularly the wheel arranged on the outside in the middle of the transport container can optionally take a fixed instead of swiveling form, although a setup with only castors provides the transport containers with the greatest possible maneuverability. Product containers 2 run with these castors 25 over a guide 5,6 arranged on the frame and are thus supported fully on both sides in all parts of the track. The guide is shown separately in FIG. 7 and comprises two straight rails 5,6 which connect close-fittingly onto substantially flat tables 9 on the end surfaces of the apparatus. In all parts of the track the guide 5,6,9 thus provides on both sides of product containers 2 a support surface for receiving thereon the castors 25 of the transport containers. The support surface provided by the innermost 5 of the two rails 5,6 is herein provided in transverse direction, see FIG. 4, with a slight convexity 7 for receiving on an apex thereof a running surface of the castors 25 on this side of transport container 2. As a consequence a perfectly straight tracking of transport containers is obtained and transverse movements of the transport containers are limited to a minimum. Furthermore, drive belt 1 is thus substantially only under strain of tension for which the belt is designed. The other of the two rails 6 provides a flat support surface 8 and serves only to support the already tracking product containers 2.

With an eye to an unexpectedly occurring, extremely great action of transverse forces, the support surface 7 of at least one of the two rails 5,6 is-arranged in the bottom of a unshaped profile, so that the flanks 71 thereof provide an extra certainty against derailment of the transport containers in this part of the track. Both rails 5,6 comprise in this embodiment extrusion profiles formed from aluminum, although use can be made instead of other materials and manufacturing methods. In the bends of the track the product containers 2 can in principle travel freely over tables 9, thereby held in their path by drive belt 1. Because drive belt 1 here lies tightly over a revolving wheel 3,4, it can withstand a relatively large transverse load in the bends and the lateral tolerance of transport containers 2 is minimal here. Castors 25 herein ensure a smooth travel of transport containers 2 through the bends.

As can be seen in the top view of FIG. 1, the transport containers 2 spread apart in the bends and draw closer together again after a bend in the straight part of the track In order to enhance the tracking of the whole here, the separate transport containers are provided on the side remote from drive belt 1 with coupling members 26 which mutually co-act in the straight part of the track to bring about an engagement between successive transport containers. Coupling members 26, see FIG. 8, comprise plastic parts arranged on the end surfaces of transport containers 2. The coupling members herein comprise in each case a transverse rib 27 on the one transport container which is received loosely in an almost complementarily formed transverse groove 28 on the adjoining side of the subsequent transport container. In addition to a fixation in vertical direction, coupling members 26 also provide a relatively soft bumper to absorb and damp mutual collisions of transport containers. If desired, this action can be enhanced by giving the coupling members a resilient or (gas-) damped form. As a result of the thus present engagement, transport containers 2 behave in the straight part of the track as a coherent whole, wherein a lateral tolerance is allowed to maintain a tracking freedom of wheels 25 of the separate transport containers 2. If desired, similar coupling members 26 can also be used on the belt side of transport containers 2 to further strengthen the engagement between transport containers 2 and to have it come into effect earlier after leaving a bend. The ribs 27 are narrower on their outer end for a self-positioning centering in groove 28 of the adjoining transport container. A curve or other two-dimensional profile can, if desired, be arranged in the groove to also bring about a transverse fixation.

In the shown configuration the apparatus comprises two series of individually controllable discharge stations 41,42, each with an associated loading station 31,32 respectively, see FIG. 1. At the position of a loading station 31,32 products are placed, optionally manually, in transport containers 2, while in discharge stations 41,42 dispatch boxes are disposed under transport containers 2 to receive products for a specific destination. A choice has been made in this embodiment for diametrically opposite loading stations 31,32 extending over two transport containers 2. It is also possible to opt instead for a single loading station which can if desired extend over a greater or lesser number of transport containers in order to increase the number of different destinations which can be served in one lap of the apparatus. The advantage of the shown configuration, wherein loading stations 31,32 are provided just after a bend in the track and the associated discharge stations 41,42 respectively are all disposed in a straight path before the other bend, is however that products herein never have to be co-displaced in a bend. After a bend the products come to lie in a product container and have in principle been discharged, before the following bend, at the intended location in one of the discharge stations. Thus is avoided that the products lying loosely in the product container are subjected to centrifugal forces which occur in the bends, with the danger of a product being flung out of the product container. This danger is therefore no longer a prohibitive factor in increasing the circulation speed of belt 1 if desired.

Figure 9A:
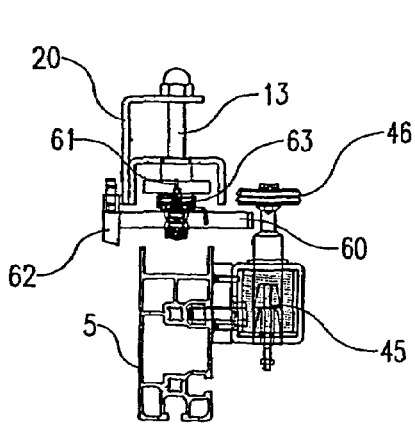
FIGS. 9A-B show a cross-section of an actuator as applied in the apparatus of FIG. 1 in respectively a free and actuated position.
Figure 9B:
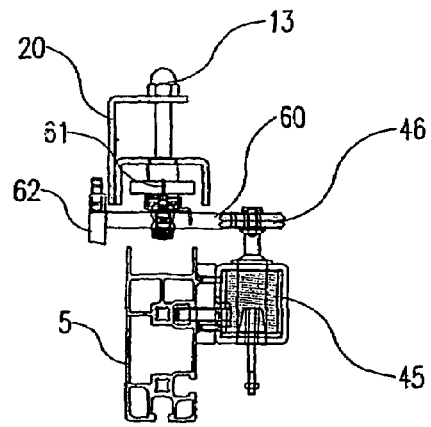

The whole process is controlled by a computer-driven control. The supplied products are first identified at a loading station 31,32, either manually by inputting product information, optionally with a hand-scanner, or automatically wherein the product passes a product scanner before or after entering a transport container 2. In both cases it is precisely known at loading station 31,32 per transport container 2 which product is located therein. Transport containers 2 are co-displaced on the drive belt 1 and then pass a series of discharge stations 41,42. These stations 41,42 each comprise an electronically controllable actuator 45, here in the form of a solenoid, which can be selectively energized by the control of the apparatus. As soon as a transport container 2 passes a discharge station 41,42 with a product intended therefor, the control will drive the relevant actuator 45 so as to carry it from a first position as shown in FIG. 9A to a second position as shown in FIG. 9B. In this second position the actuator 45 strikes against lock 60 of the locking mechanism of the passing transport container 2, whereby the tilt trays 21,22 thereof are released and the load will fall out of the transport container into a waiting dispatch box. Actuator 45 is provided on its end with a free-running wheel 46 for making contact with the locking mechanism 60 so that mutual friction and wear are limited to a minimum.

An additional discharge station 43 is provided just prior to both bends so as to discharge into one of the preceding discharge stations 41,42 all products for which no destination can be found, so that not even such a product will be co-displaced in a bend. With a view hereto, openings 28 are arranged in a carrying panel 21,22 of each transport container so that it is possible to determine whether a load is lying thereon. Arranged for this purpose under the transport path just before the additional discharge station is an optical sensor which is able to scan openings 28 and, in the case they are blocked by a load which is evidently still present, drives either directly or indirectly the actuator 45 of discharge station 43. The products which are discharged here are available for the loading stations and are collected directly in a collecting container for this purpose or discharged by means of an optionally driven conveyor belt or the like.

After passing discharge stations 41,42,43 and discharging the load at the intended destination, the transport containers 2 arrive at a resetting device which causes the transport containers 2 to be returned to their closed starting position so as to be ready for a following lap in the apparatus. The resetting device here comprises a closing guide at the entry to each bend, the operation of which is shown further in FIG. 5. The closing guide comprises a gradually progressing profile which, as seen in the direction of transport, approaches the tilt axes 23 of transport containers 2. The transport containers are provided at least on their foremost tilt tray 21 with a stop protrusion with which this tray strikes against the closing guide 50 as it passes the resetting device. The tilt tray is thus gradually lifted up and eventually returned to the transporting position. Due to the mutual coupling with the other tilt tray 22, the same will apply for this latter, so that the whole transport container has been returned fully to the closed starting position at the end of the passage over the closing guide. During this process the foremost tilt tray 21 actuates the locking mechanism 60 which herein snaps closed under the tension of locking spring 63 and thus fixes trays 21,22 in the meanwhile assumed transporting position. The transport container is now ready for a following lap.

Using relatively simple means a very high sorting capacity can thus be achieved which, depending on the number of transport containers applied and the chosen circulation speed, rises in practice to the order of magnitude of 4500-9000 units per hour. Although in this case the apparatus is employed for books and magazines, the apparatus is in principle applicable for a wide range of products which may or may not be packed and can withstand the drop out of the transport container and which moreover allow easy discharge. Other applications are for instance optionally packed items of clothing and articles with relatively limited dimensions, and preferably a certain weight of their own.

Although the invention has been further elucidated above with reference to only a single embodiment, it will be apparent that the invention is by no means limited thereto. On the contrary, many more variations and embodiments are possible for the person with ordinary skill in the art within the scope of the invention. Use is thus made in the embodiment of a completely flat transport path of the transport containers, but the invention allows the bends in particular to be given a certain inclination radially so as to expose a product in the transport container to a lesser extent to the centrifugal forces occurring here. A greater bend speed, and thereby transport speed, can hereby be achieved. The sorting capacity of the apparatus can, if desired, also be increased by applying a pre-sorting.

Use was also made in the given embodiment of two tilt trays per transport container. Use can however also be made instead of a single tilt tray so as to simplify the construction, or conversely of a carrying panel with multiple divisions. Particularly in this latter case a division along a central longitudinal axis is possible, so that a set of tilt trays lies on either side thereof. Through the arrangement of separate actuators and locking mechanisms for both sets of tilt trays, both can thus be operated individually, whereby the sorting capacity of the apparatus is roughly doubled. The tilt trays of both sets are preferably each coupled herein by their own coupling rod or in other manner. A power assisting means can also be applied to the tilt trays so that they open in forced manner when unlocked.

Instead of a tilting mechanism it is also possible to opt for another type of mobility and removability of at least a part of the carrying panel of the transport containers. Use can thus be made for instance of an optionally actuated transverse sliding-away of this part and, instead of a tilting on a tilt axis directed transversely of the transporting direction, it is possible to opt for a tilting in another direction, in particular on a tilt axis directed in the transporting direction.

The invention claimed is:

1. Apparatus for transport and controlled discharge of a load, comprising:
    a frame with a guide for a series of displaceable transport containers,
    a drive means for carrying the transport containers in an endless path, and
    a resetting device for placing a transport container in a starting position and a discharge station for selectively receiving a load of a transport container,
    wherein the transport containers are provided with an at least partially movable carrying panel for receiving of the load thereon, the carrying panel comprising a tray that is operated selectively between an upwardly facing transporting position and a downwardly depending discharge position,
    wherein the guide includes on both sides of the transport containers a support surface on which free-running castor wheels of the transport containers are upwardly supported, and
    wherein on at least one of the sides of the transport containers the support surface comprises an upwardly protruding convexity in a direction transversely of a transport direction of the transport containers for receiving thereon a running surface of at least one of the wheels of the transport containers.

2. Apparatus as claimed in claim 1, characterized in that the drive means comprise an endless driven belt which runs along the track and to which the transport containers are coupled.

3. Apparatus as claimed in claim 1, characterized in that the carrying panel comprises at least one tilt tray which is selectively tiltable on a tilt axis between a substantially horizontal transporting position and a downward hanging discharge position.

4. Apparatus as claimed in claim 1, characterized in that at least one of the support surfaces forms part of a bottom of a substantially u-shaped profile which is adapted to receive therein at least one of the wheels of a transport container.

5. Apparatus as claimed in claim 4, characterized in that the transport container comprises on either side of the wheel a stop which is adapted to strike against an upright wall of the profile in the case of a transverse displacement of the transport container.

6. Apparatus for transport and controlled discharge of a load, comprising:
    a frame with a guide for a series of displaceable transport containers,
    a drive means for carrying the transport containers in an endless path, the transport containers being coupled to the drive means with first coupling members,
    a resetting device for placing a transport container in a starting position and a discharge station for selectively receiving a load of a transport container,
    wherein the transport containers are provided with an at least partially movable carrying panel for receiving of the load thereon, the carrying panel comprising a tray that is operated selectively between a transporting position and a discharge position,
    wherein between successive transport containers there are provided second coupling members spaced from said first coupling members and from said drive means and which, at least in a straight part of the path, mutually co-act in order to engage the successive transport containers, and
    wherein the second coupling members disengage from each other when the successive transport containers spread apart in a bend of the path whereas the successive transport containers stay coupled to the drive means with the first coupling members, and
    wherein the drive means follows the endless path.

7. Apparatus as claimed in claim 6, characterized in that the second coupling members comprise a rib on one transport container, said rib extending substantially horizontally and transversely of a transporting direction of the transport containers, and an at least substantially complementary groove on another transport container directly adjacent to the one transport container, said rib being received loosely in the groove.

8. Apparatus as claimed in claim 7, characterized in that the rib and groove are curved along at least a part of their length.

9. Apparatus as claimed in claim 7, characterized in that at least in cross-section the rib narrows toward a free end over at least a part of its height.

10. Apparatus as claimed in claim 6, characterized in that the second coupling members comprise elements which are arranged on the transport containers and which are manufactured from plastic.

11. Apparatus as claimed in claim 6, wherein the first coupling members include a manually releasable rapid-action coupling to the drive means.

12. Apparatus as claimed in claim 6, characterized in that the resetting device is arranged at the entry into a bend in the path.

13. Apparatus as claimed in claim 6, characterized in that a loading station is arranged after the exit from a bend in the path in order to feed a load to a passing transport container, and that the discharge station is placed before the entry into a subsequent bend in the path.

14. Apparatus as claimed in claim 6, characterized in that the carrying panel of the transport containers comprises two sets of tilt trays which are placed adjacently of each other in a longitudinal direction and which pivot pairwise about a common tilt axis, that a resetting device and an operating member of a discharge station are provided on either side of the track, and that the sets of tilt trays are each provided with a locking mechanism.

15. Apparatus for transport and controlled discharge of a load, comprising:
- a frame with a guide for a series of displaceable transport containers;
- a drive means for carrying the transport containers in an endless path, the transport containers being coupled to the drive means with first coupling members; and
- second coupling members between successive transport containers, said second coupling members being spaced from said first coupling members and from said drive means and, at least in a straight part of the path, mutually co-act to engage the successive transport containers,
- wherein the second coupling members disengage from each other when the successive transport containers spread apart in a bend of the path whereas the successive transport containers stay coupled to the drive means with the first coupling members,
- wherein the drive means follows the endless path.

* * * * *

UNITED STATES PATENT AND TRADEMARK OFFICE
CERTIFICATE OF CORRECTION

PATENT NO.      : 7,604,448 B2                           Page 1 of 1
APPLICATION NO. : 10/495783
DATED           : October 20, 2009
INVENTOR(S)     : Balk et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 505 days.

Signed and Sealed this

Fifth Day of October, 2010

David J. Kappos
*Director of the United States Patent and Trademark Office*